United States Patent [19]

Cumpston

[11] 4,171,071

[45] Oct. 16, 1979

[54] METERED FEEDER HAVING A ROTARY GROOVE AND A COOPERATING SCRAPER FOR DIFFICULT TO METER SOLIDS

[76] Inventor: Edward H. Cumpston, 43 Monument Ave., Old Bennington, Vt. 05201

[21] Appl. No.: 869,287

[22] Filed: Jan. 13, 1978

[51] Int. Cl.² ............................................. G01F 11/10
[52] U.S. Cl. .................................... 222/167; 222/254; 222/342; 222/414
[58] Field of Search ........................ 222/167, 169–172, 222/196, 201, 227, 236–242, 252, 254, 342, 345, 368, 410, 414

[56] References Cited

U.S. PATENT DOCUMENTS

| | | | |
|---|---|---|---|
| 1,090,120 | 3/1914 | Scott | 222/342 X |
| 1,527,128 | 2/1925 | Durouaux | 222/167 |
| 1,997,791 | 4/1935 | Hoberg et al. | 222/368 X |
| 2,548,245 | 4/1951 | Stevens et al. | 222/368 X |
| 2,720,340 | 10/1955 | Gustafson | 222/167 |
| 3,606,099 | 9/1971 | Benson | 222/414 X |
| 3,608,787 | 9/1971 | Grataloup | 222/342 |

Primary Examiner—Robert J. Spar
Assistant Examiner—Fred A. Silverberg
Attorney, Agent, or Firm—Stonebraker, Shepard & Stephens

[57] ABSTRACT

A feeder for particulate solid material uses a metering rotor for continuously metering the feed rate. A continuous groove around the rotor is formed between axially spaced lands, and the rotor is oriented for rotating around a horizontal axis. The material is continuously dropped onto an upper region of the rotor at a rate substantially greater than the metering rate of the feeder for continuously overfilling the groove with material. A scraper extends over the groove between the lands in the upper region for scraping away excess material to give the material remaining in the groove a predetermined and continuous shape as the rotor turns. An output conveyor continuously receives material falling from the groove as the material turns with the rotor past the upper region.

8 Claims, 4 Drawing Figures

METERED FEEDER HAVING A ROTARY GROOVE AND A COOPERATING SCRAPER FOR DIFFICULT TO METER SOLIDS

BACKGROUND OF THE INVENTION

Prior art devices for measuring and feeding particulate solid materials suffer many disadvantages and do not achieve accurate metering. Much of the solids metering art has involved batch processes where measurement occurred by dumping bags full of material into a container. Continuously metering the feed of dry, solid particulate material has been attempted with single and double screw feeders, vibratory feeders and hoppers, and feedback systems such as weigh conveyors. These devices suffer many inaccuracies from flow variations affected by relative humidity, depth of material in a hopper, variations in batches of material, extent of preconditioning of material, clogging, bridging, rat-holing, etc. Some materials can pack between the lands of a screw feeder and rotate around with the screw without advancing, and materials can accumulate and lodge in many places in many different ways. Any such accumulation of material in a feeder reduces the feed rate as the material collects and produces a surge in the feed rate whenever the accumulation breaks loose and joins the output flow. Feed rates varying with the depth of material in a supply hopper are especially troublesome, and variations in solid feed rates can occur rapidly over such a range that feedback systems cannot make the flow accurate, because of the necessary time lag involved. Mixing, stirring, and agitating devices have been used to condition material so it will feed more accurately, and these also have been only partially successful. In addition to other disadvantages, double screw feeders are easily disabled by contaminant objects that can catch between the screws and require shutdown and repair. Metering solids feeders have been arranged in tandem for successively smoothing out irregularities in the flow, with incomplete success, and high accuracy and reliability in continuously metering the feed of solid particulate material is not attainable for many materials by using devices presently on the market.

The invention involves recognition of a way of solving many of the problems involved in accurate metering of the continuous feed of solid particulate materials, and the invention aims at solving these problems for a wide variety of solid particulate materials with a relatively simple and inexpensive device. The invention also aims at accommodating extremely uneven supply rates; convenient, reliable, and economical operation; and wide variation in metering rates without loss of accuracy.

SUMMARY OF THE INVENTION

The inventive feeder is for continuously metering particulate solid material. It includes a generally cylindrical metering rotor having a continuous and scrapable groove formed between axially spaced lands extending around the rotor, with the rotor being oriented for rotating around a generally horizontal axis. The material is continuously dropped onto an upper region of the rotor at a rate substantially greater than the metering rate of the feeder for continuously overfilling the groove with the material. A scraper extends over the groove between the lands in the upper region for scraping away an excess portion of the material to give the material remaining in the groove and rotating past the scraper a predetermined and continuous shape as the rotor turns. An output means continuously receives material falling from the groove as the material turns with the rotor past the upper region, and any material remaining in the groove can be scraped out by another scraper extending to the groove bottom. A rotating drum surrounding the rotor is preferably used to hold a reservoir of the material below the rotor and both tumble and condition the material and also drop the material onto the upper region of the rotor as the drum turns, and several scrapers are preferably arranged in tandem in the upper region. An enclosure is preferably arranged between the last scraper and the output so that only material falling from the groove enters the output, and a vibrator preferably vibrates the scrapers and any portion of the enclosure where material might collect.

DRAWINGS

DETAILED DESCRIPTION

Figure 1:
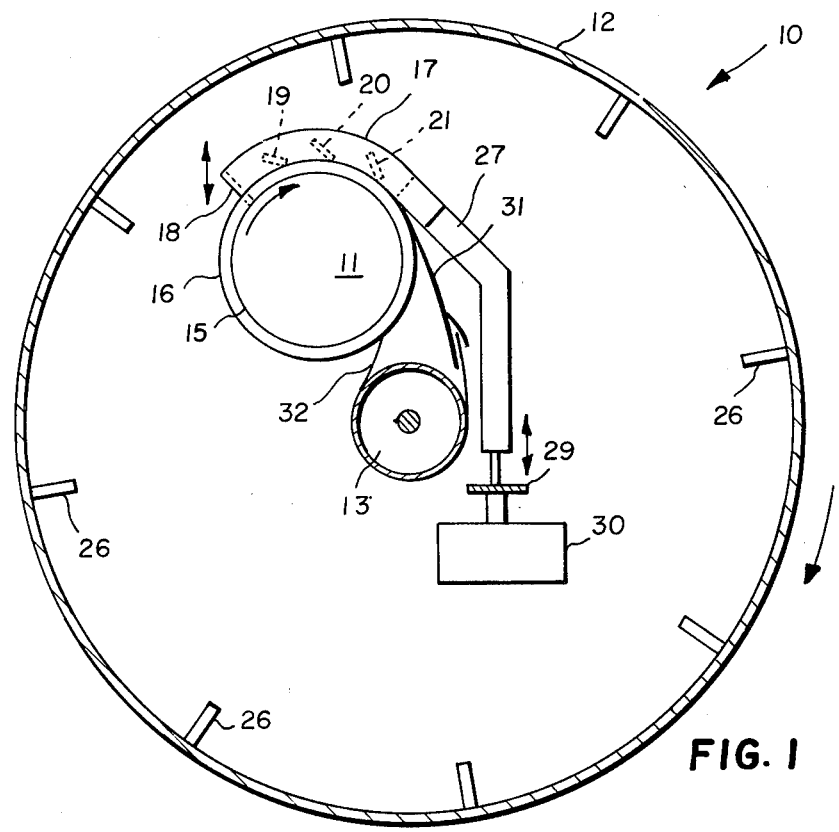
FIG. 1 is a partially schematic, end elevational view of a preferred embodiment of the inventive feeder shown with an end removed.

This invention was made following an unsuccessful search for existing equipment capable of metering the feed of dry, solid particulate material continuously with high accuracy. Many metering feed devices were investigated and found to be substantially inaccurate in metering the feed of many materials. With some materials such as dry, powdered clays or powdered titanium dioxide, feeding devices suffered from blockages, bridging, clogging, and material accumulation or lodgement reducing or producing gaps in the flow and subsequent surges when lodged material broke loose. Also feed rates varied with relative humidity, depths of materials in input hoppers, the extent of preconditioning of a material, and even with different batches of the same material having unforseeable feeding differences.

These failures led to experimentation with other feeding techniques, developed first as bench models or simulations, and leading to a metering feeder using the principles explained below. The preferred feeder 10 shown in the drawings is schematically illustrated for clearly and simply presenting the principles involved without cluttering the disclosure with mechanical detail. Persons skilled in the art of building machinery will be able to provide the necessary details for mounting, driving, and supporting the elements and components involved in a metering feeder according to the invention.

Metering in feeder 10 is accomplished by rotor 11 receiving particulate solid material from rotary drum 12 and metering the material at a predetermined rate to an output conveyor 13. Drum 12 inputs material to rotor 11 substantially faster than the metering rate to overfill rotor 11 as explained more fully below, and output conveyor 13 has a potential feed rate faster than the maximum metering rate for quickly outputting all the material it receives from metering rotor 11.

The invention is best explained beginning with the preferred structure and operation of metering rotor 11. Rotor 11 is generally cylindrical and preferably formed of a cylindrical pipe having a substantial diameter of, for example, 8 inches. Somewhat smaller and much larger diameters are also possible. Rotor 11 is oriented for rotating around its generally horizontal axis as shown, and the periphery of rotor 11 is formed with at least one metering groove 15. Lands 16 are formed as raised ridges or rings encircling rotor 11, and the axial surface of rotor 11 between lands 16 forms grooves 15 for metering material. The axial length of rotor 11 can be formed with a single groove 15 or a multitude of grooves; but the illustrated 3 grooves 15, each about 6 inches wide, have been found to work well. Multiple grooves also allow greater variation in the output rate, because individual grooves can be covered over and not used. The height of lands 16 establishing the depth of grooves 15 is preferably on the order of 1 inch so that lands 16 can have a 10 inch diameter on an 8 inch diameter rotor 11. Of course, many other dimensions can be used.

The diameter of rotor 11 is large enough so that material dropped or fed onto the top or upper region of rotor 11 can accumulate to a desired depth and turn with rotor 11. Material is dropped or poured onto the upper region of rotor 11 fast enough to overfill grooves 15 as rotor 11 turns and form a continuously maintained pile of material on top of rotor 11. At least one scraper is used to level or otherwise scrape away the excess material and shape the material that remains in grooves 15 and passes under the scraper as rotor 11 turns. The material passing under the last scraper turns with rotor 11 to an angle sufficiently off the vertical so that the material falls from grooves 15 into output conveyor 13 for output from feeder 10.

The filing and scraping away of material gives a continuous and predetermined cross-sectional shape to the material remaining within grooves 15 for accurate metering as a function of volume. The metering rate can then be established by the depth or cross-sectional area of the material in the grooves, the number of grooves, and the speed of rotation of rotor 11. So long as the grooves are constantly overfilled and accurately scraped so that the material in the grooves has a predetermined and constant shape, metering can be accurately made a function of the rotational speed of rotor 11. Since rotational speed can be controlled with high accuracy, metering of the most difficult to meter solids can be performed continuously with high accuracy by feeder 10.

Support arms 17 are arranged over the tops of lands 16 to support a scraper blade assembly as schematically illustrated. A barrier plate 18 is secured to the free ends of support arms 17 and extends into grooves 15 between lands 16 to help deposit and accumulate a pile or supply of material to fill grooves 15 as they approach the top center of rotor 11. A first scraper blade 19 is spaced from barrier plate 18 to scrape away or hold back excess material and allow only a depth of material extending from the bottom of groove 15 to the top of lands 16 to pass under scraper blade 19. Scraper 19 is preferably formed of a flat, straight steel bar extending between axially spaced support arms 17 and positioned so that the lower edge of scraper 19 is at the level of the top or radially outermost surfaces of lands 16. Blade 19 is also positioned at an acute angle to the tangent to rotor 11, although many different angled orientations of scraper blades may work.

A succeeding scraper blade 20 is positioned between support arms 17 rotationally downstream from scraper blade 19, and the space between blades 19 and 20 allows more material to fall onto the material already in grooves 15. Blade 20 again scrapes away or holds back excess material and allows the material in grooves 15 to pass under scraper blade 20 only up to the height of the bottom of scraper blade 20. Rotationally downstream of blade 20 more material is added to the material in grooves 15, and a final scraper blade 21 scrapes away and holds back the excess to pass only a predetermined rate of material under blade 21.

For some materials, a single filling of the rotor grooves and a single scraping away of the excess might be adequate to achieve the desired accuracy. Experience with materials such as titanium dioxide, which is very difficult to meter accurately, indicates that three fillings and scrapings all to the same level or height of material is more accurate than a single filling and scraping or even a double filling and scraping. Increase in accuracy diminishes with increase in the number of fillings and scrapings, however.

Grooves 15 need not be flat bottomed as illustrated and can be concave, V-shaped, or have some other configuration, although flat bottomed grooves are preferred for their simplicity and workability. Also, scraper blades need not be straight and level with the tops of lands 16 separating the grooves; and scrapter blades can be shaped to form the upper surface of the material remaining in the grooves as concave, convex, or having some other configuration, although scraping the material flat and level with the tops of lands 16 is preferred for simplicity. Once the dimensions of the grooves and the positions of the scrapers are established, the volumetric feed rate can be accurately controlled by regulating the rotational speed of rotor 11, and driving equipment such as an SCR gear motor drive is readily available for accomplishing this accurately. Rotor 11 preferably turns relatively slowly at from 1 to a few rpm, but much faster speeds may be possible.

The input of material to the upper region of rotor 11 can be accomplished with many different conveyors or feeders, but drum 12 is preferred for several reasons. Drum 12 is preferably arranged to surround rotor 11 and hold a reservoir of material in the bottom region of drum 12 below rotor 11. Drum 12 can be externally supported and rotated by external drive means so that it does not require a through axis and allows rotor 11 and associated equipment to be cantilevered from a support stand 25 and removably inserted into one end of drum 12. This facilitates cleaning, repair, and servicing. Drum 12 preferably has internal lifters 26 that scoop material as they pass around the bottom of drum 12 and raise the scooped material up over the top of rotor 11 where it spills down onto the upper region of rotor 11 where scraper bars 19–21 are located. Drum 12 is rotated at a speed sufficient to bring material up above the level of the top of rotor 11 and let the material fall gravitationally onto the upper region of rotor 11 at a substantially faster rate than the metering rate of rotor 11. This insures that grooves 15 are reliably overfilled so that scrapers 19–21 act effectively and accurately in shaping the material that remains in grooves 15 and passes under the final scraper blade 21 into output conveyor 13. Rotation at about 75 percent of the critical speed for drum 12 works well and keeps material well tumbled and adequately supplied to the top of rotor 11. Excess material falls back to the reservoir of material at the bottom of drum 12. The tumbling action of material within drum 12 breaks up lumps, conditions the material, and keeps the material well mixed and well divided for more accurate metering. Drum 12 is also not subject to clogging and reliably delivers an over supply without any gaps in the input feed to rotor 11, as gaps would spoil the metering accuracy of feeder 10. Drum 12 preferably rotates in the same direction as the rotor 11, although drum 12 and rotor 11 can also be arranged to counter-rotate.

Figure 3:
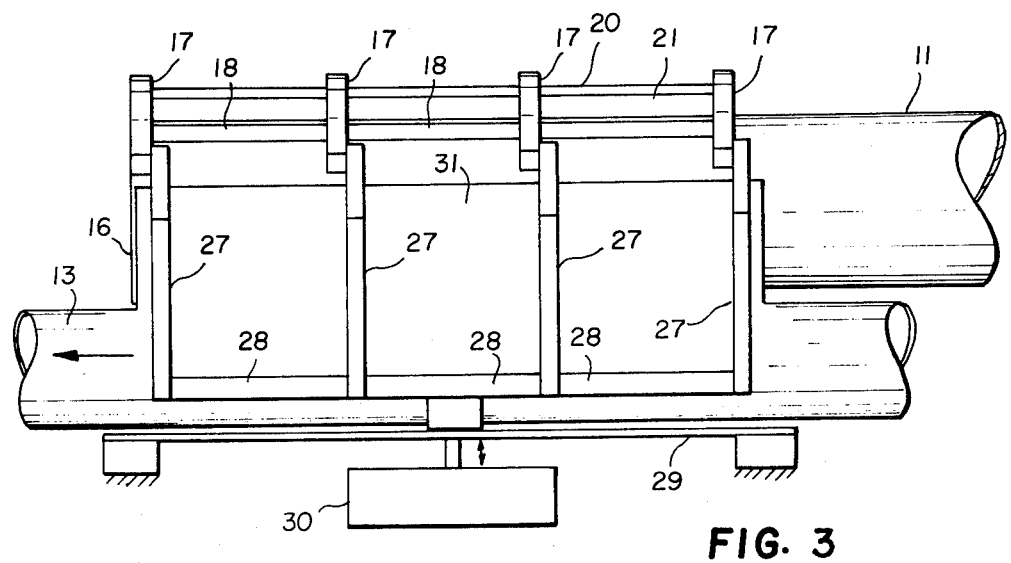
FIG. 3 is a partially schematic, side elevational view of a scraper blade assembly and vibrator.
Figure 2:
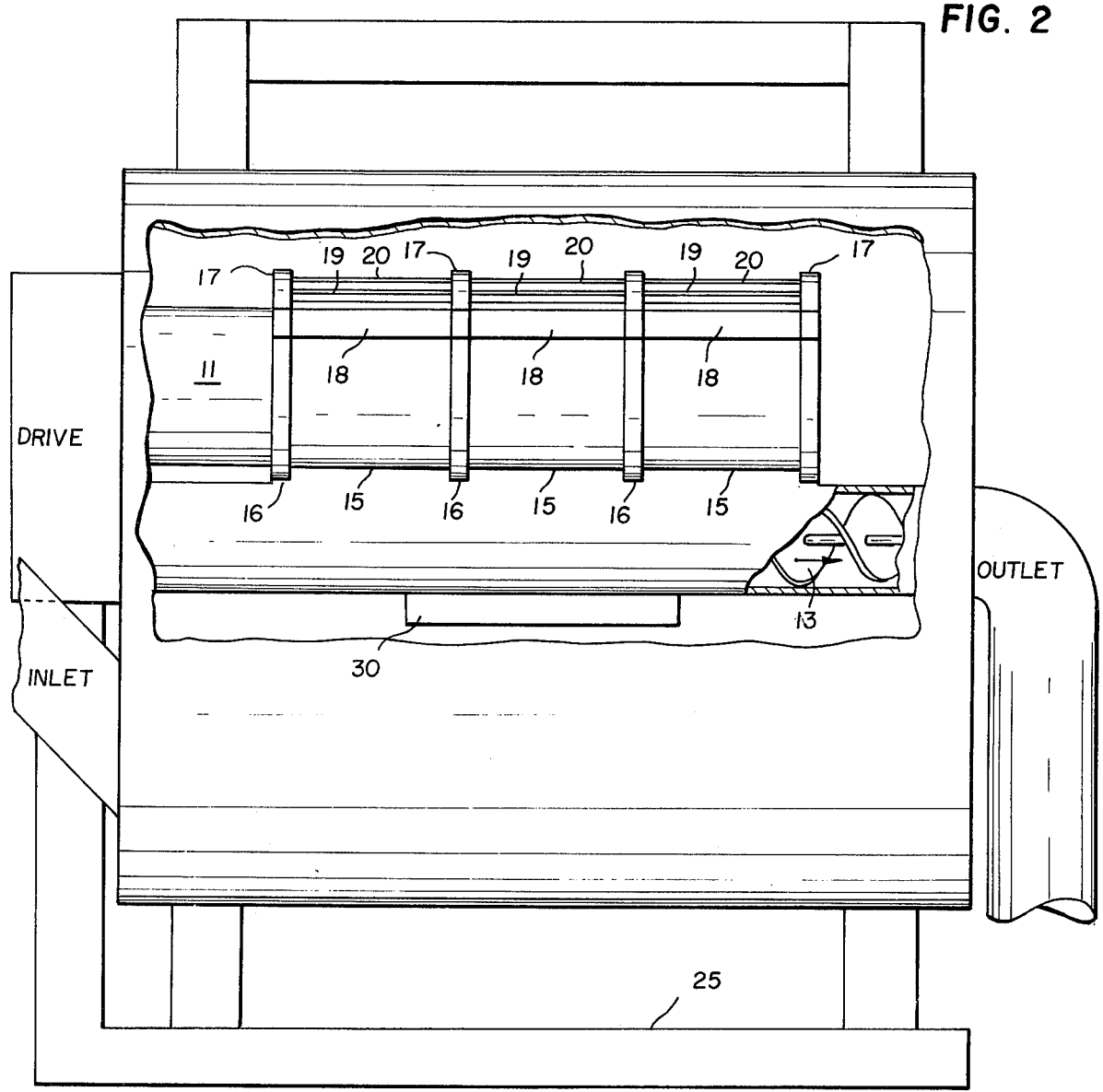
FIG. 2 is a partially schematic, partially cutaway, side elevational view of the feeder of FIG. 1.
Figure 4:
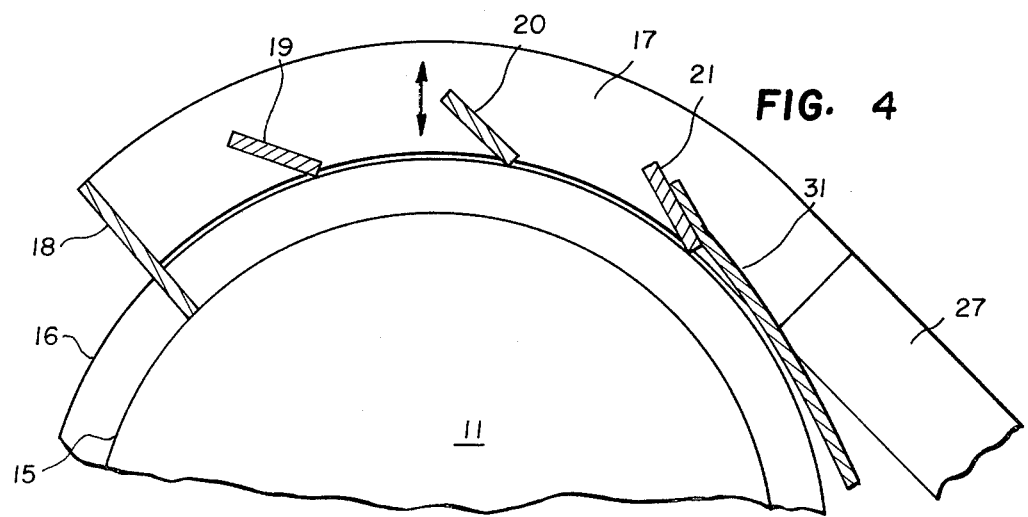
FIG. 4 is an enlarged, fragmentary cross-sectional view of the metering rotor and scraper blade assembly of the feeder of FIG. 2, taken along the line 4—4 thereof.

For some difficult-to-meter materials, scraper blades 19-21 are preferably vibrationally driven, as best shown in FIG. 3. Blade support arms 17 holding blades 19-21 are secured to frame arms 27 that are fastened to a bracket 28 that is resiliently supported by a flat, leaf spring 29. A vibrator 30, such as an electromagnetic vibrator, drives bracket 28 in a vertically reciprocal vibration accommodated by spring 29 for vibrating scraper blades 19-21. This helps prevent any lodging or accumulation of material around blades 19-21 and insures smooth scraping and shaping of the material that passes under blades 19-21. The vibration of blades 19-21 thus helps prevent inaccuracies that might occur from lodging of lumps under a scraper making an uneven surface on the material passing under the scraper or buildup of material and then breaking loose of built-up material where the lower edges of blades 19-21 engage and shape the material that is metered under the blades.

An enclosure wall 31 extends from scraper blade 21 downward toward output conveyor 13, and enclosure wall 31 extends for the axial length of rotor 11 to prevent entrance of any material into output conveyor 13 except the material metered under scraper blade 21 in grooves 15. Since some materials can build up on a wall such as enclosure wall 31, it is preferably mounted to support arms 17 so that wall 31 is vibrationally driven with blades 19-21 to prevent any accumulation of material. Many solid particulate materials develop static electric charges as they are handled, and they can readily collect on stationary surfaces so that vibration of enclosure wall 31 is preferred. A fixed enclosure wall 32 overlaps with enclosure wall 31 and extends around output conveyor 13 and preferably up to the bottoms of grooves 15 as best shown in FIG. 1 to act as a scraper to insure that all material is removed from grooves 15 and delivered to output conveyor 13. The upper or scraper portion of fixed wall 32 is preferably angled back as shown in FIG. 1 to prevent any accumulation of material on wall 32.

Output conveyor 13 can have many forms and preferably has a feed capacity substantially greater than the fastest metering capacity of rotor 11. The task of output conveyor 13 is to deliver all the material it receives quickly and reliably, but it need not have any metering capacity itself. Output conveyor 13 can be an ordinary screw feeder, for example, because it receives material at an accurately metered rate in loose and feedable condition and must merely advance eveything it receives. Conveyor 13 can also be a belt conveyor or drag conveyor or some other type of conveyor. Moreover, no output conveyor is required at all if the metered material from rotor 11 can be directed to a receiver by gravity or some other flow. Furthermore, a liquid flush or flow can also transport the metered material.

Material can be inlet into drum 12 in all sorts of ways such as emptying a bag at a time or periodic input from a hopper or other unmetered feeder. Experience has shown the metering rate of feeder 10 to be invariable with different amounts of material in the reservoir in the bottom of drum 12 so that a metered input to drum 12 is not necessary. One simple way of mounting and driving drum 12 is with external belts tht both cradle and rotate drum 12, although other drive and support arrangements for drum 12 are clearly possible. Cantilevered steel beams or other structures can be used for supporting rotor 11, output feeder 13, vibrator 30, and other components within drum 12; and many alternatives are possible for mounts, supports, bearings, drives, etc.

I claim:

1. A continuous metering feeder for particulate solid material subject to feed rate variations from clogging, bridging, packing and accumulations, said feeder comprising:
    (a) a generally cylindrical metering rotor having a continuous groove formed between axially spaced lands extending around said rotor;
    (b) said rotor being oriented for rotating around a generally horizontal axis;
    (c) means for continuously dropping said material directly in a free and unrestrained fall onto an upper region of said rotor at a rate substantially greater than the metering rate of said feeder for continuously overfilling said groove with said material piled loosely to a level above said lands;
    (d) a scraper extending over said groove between the tops of said lands in said upper region for scraping away an excess portion of said loosely piled material above said lands to give said material remaining in said groove and rotating past said scraper in said groove a predetermined and continuous cross-sectional shape throughout a region between said lands, said groove, and said scraper as said rotor turns;
    (e) means for vibrating said scraper;
    (f) said scraper being oriented at an acute angle to the tangent to said rotor in the region of said scraper;
    (g) means for preventing said dropping material from entering said groove rotationally beyond said scraper; and
    (h) means for continuously receiving said material falling from said groove as said material turns with said rotor past said upper region wherein said scraper is formed as a plurality of scrapers arranged in tandem in said upper region so said material is dropped onto said rotor to overfill said groove to a level above the lands in a region rotationally ahead of each of said scrapers, and said material is not dropped into said groove rotationally beyond said plurality of scrapers, each successive one of said scrapers improving the accuracy of said predetermined cross sectional shape.

2. The metering feeder of claim 1 wherein said means for continuously dropping said material on said rotor comprises a rotating drum surrounding said rotor to hold a reservoir of said material below said rotor and drop said material onto said upper region of said rotor as said drum turns.

3. The metering feeder of claim 1 wherein said receiving means includes an output conveyor.

4. The metering feeder of claim 1 including an enclosure arranged between said scraper and said receiving means so that only said material falling from said groove enters said receiving means.

5. The metering feeder of claim 4 including means within said enclosure for scraping said groove clean of said material.

6. The metering feeder of claim 4 wherein said receiving means includes an output conveyor.

7. The metering feeder of claim 4 wherein said means for continuously dropping said material on said rotor comprises a rotating drum surrounding said rotor to hold a reservoir of said material below said rotor and drop said material onto said upper region of said rotor as said drum turns.

8. The metering feeder of claim 7 wherein said receiving means includes an output conveyor.

* * * * *